April 21, 1964
R. R. BOWER
3,129,822
ARTICLE HANDLING
Filed March 6, 1961
3 Sheets-Sheet 1
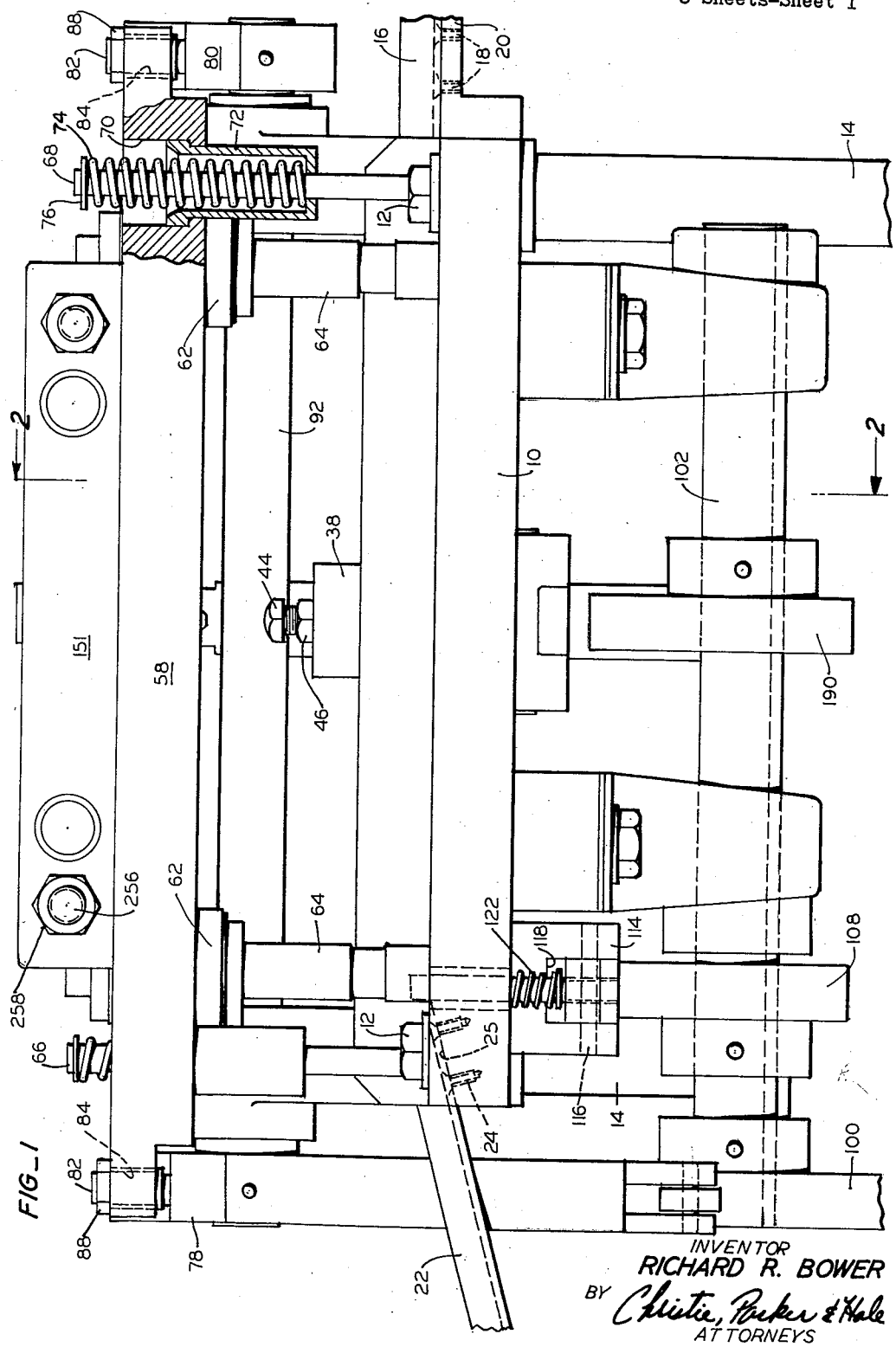
FIG_1
INVENTOR
RICHARD R. BOWER
BY Christie, Parker & Hale
ATTORNEYS

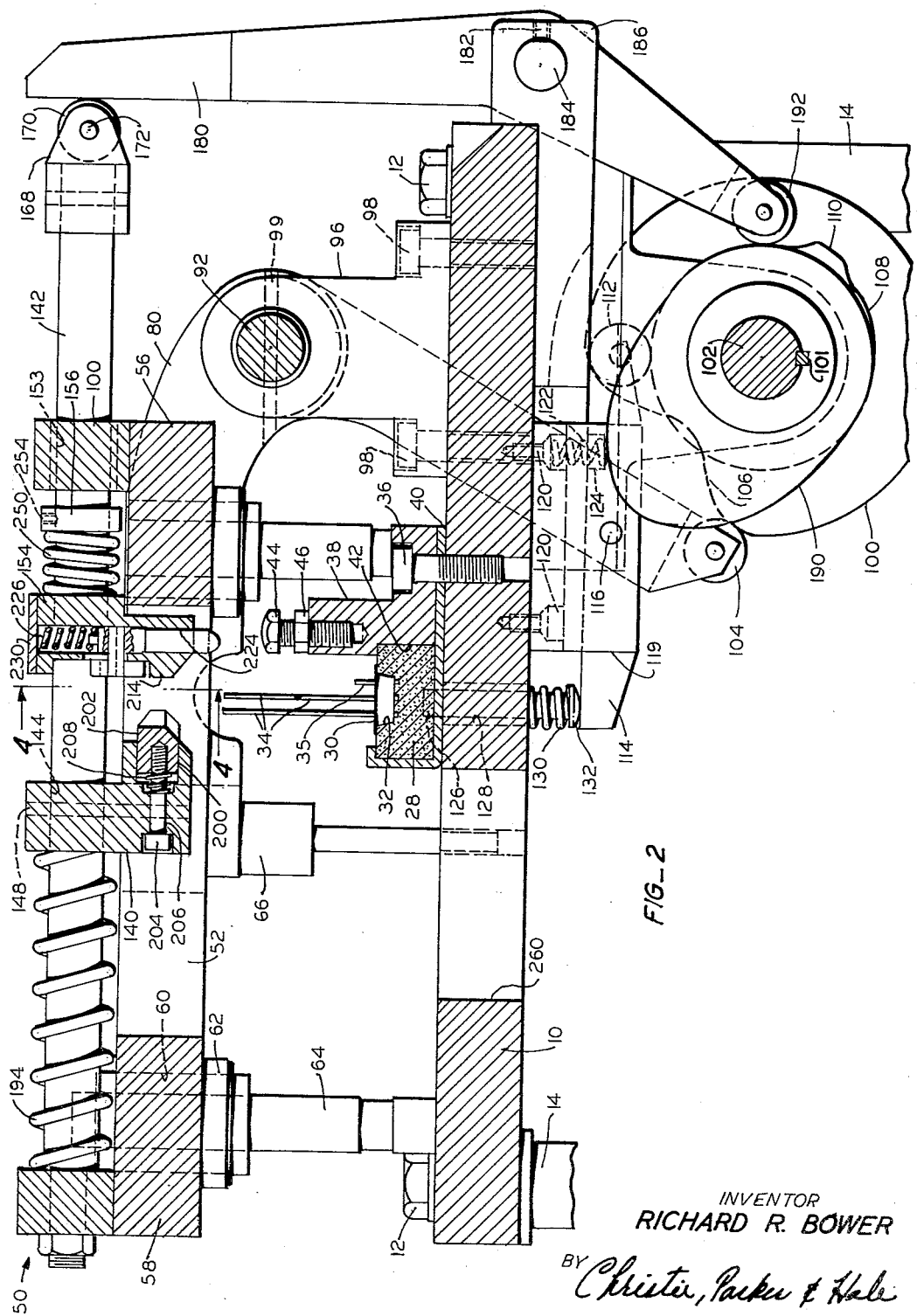

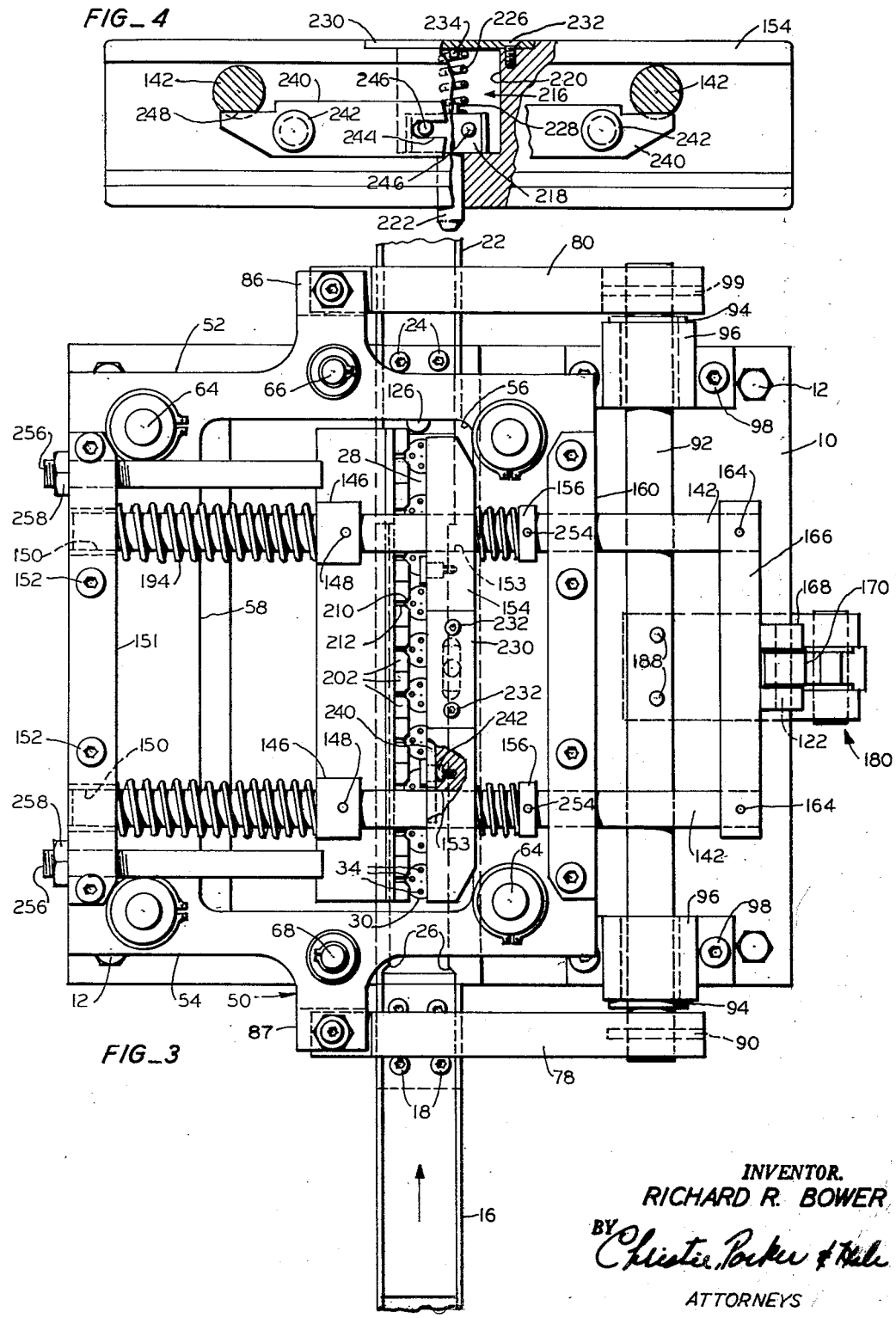

United States Patent Office 3,129,822
Patented Apr. 21, 1964

3,129,822
ARTICLE HANDLING
Richard R. Bower, Palo Alto, Calif., assignor, by mesne assignments, to Raytheon Company, Lexington, Mass., a corporation of Delaware
Filed Mar. 6, 1961, Ser. No. 93,692
3 Claims. (Cl. 214—1)

This invention relates to article handling apparatus.

In various operations involving the handling or processing of articles, it is often necessary to transfer the articles from one location to another. Such a job done by hand is often tedious, time consuming, and expensive. Moreover, the articles are frequently damaged by careless manual handling.

This invention provides apparatus for automatically transferring articles from one position to another without requiring the service of an operator. In its preferred form, the apparatus transfers a plurality of articles simultaneously to achieve increased production speed.

Briefly, this invention contemplates article handling apparatus that includes a base on which articles are located. A frame is spaced from the base and supported to be movable toward and away from the articles between first and second positions. A pair of jaws are mounted on the frame to be open in the first position, and close around an article when the frame is moved toward the base to the second position.

In the preferred form, the apparatus includes means for keeping the jaws closed around the articles while the frame is moved away from the base so that the articles are also moved away from the base. Means are also provided for keeping the jaws closed and moving them from the first position to the third position laterally disposed with respect to the direction of frame movement between the first and second positions. Means are provided for opening the jaws in the third position to release the articles and lock the jaws open. Means are also provided for returning the jaws from the third position to the first position so the cycle may be repeated to remove additional articles from the base.

The preferred form of the apparatus also includes a conveyor track for automatically moving articles onto the base so that the transfer operation can be made continuously.

When the apparatus is used to pick up a plurality of articles simultaneously at least one of the jaws includes a series of separate teeth mounted to be movable with respect to each other and thereby closed firmly against the other jaw even though articles of different sizes or orientation may be locked between the jaws.

These and other aspects of the invention will be more fully understood from the following detailed description and the accompanying drawings in which:

FIG. 1 is a side elevation, partly broken away, of the presently preferred embodiment of the invention;

FIG. 2 is a view taken on the line 2—2 of FIG. 1;

FIG. 3 is a plan view, partly broken away, of the apparatus shown in FIGS. 1 and 2; and FIG. 4 is a view taken on line 4—4 of FIG. 2.

Referring to the drawings, a horizontal base plate 10 is secured by bolts 12 to the upper ends of four vertical posts 14. An elongated, horizontal and upwardly opening U-shaped conveyor track 16 is secured by screws 18 to a rearwardly extending lip 20 formed integrally with the rear end (right as viewed in FIG. 1) of the base 10. The track extends over the top of the base to its forward end (left as viewed in FIG. 1), and terminates at the upper end of a downwardly extending chute 22, which is secured by screws 24 to the top of an inclined surface 25 at the forward end of the base. The sides of the conveyor track are of increased height over the base and each includes an inwardly extending horizontal lip 26 running from the rear edge of the base well past the center of the base. The conveyor track serves as a guide for a plurality of carriages or boats 28, which make a close sliding fit against the sides of the track and under the track lips.

Any type of articles can be moved along the conveyor track in the direction of the arrows, but for the purpose of explaining this invention, it is assumed that the articles are transistor headers 30 mounted in circular recesses 32 in the top surface of each boat so that three long wires 34 extend a substantial distance vertically above the top of the track. A fourth short wire 35 barely clears the top of the track. As shown best in FIG. 3, the four wires are located in a diamond pattern with respect to the direction of movement of the boats across the base. The short wire is at the right corner of the diamond.

The portion of the carriage track on the base is secured to the base by a screw 36 which extends down through an L-shaped bracket 38 located on top of a portion of the right (as viewed in FIG. 2) side of an intermediate part of the conveyor track side wall 40, which is flattened outwardly and horizontally. The inside face of the bracket includes a recess 42 which matches the portion of the side wall flattened out so that the carriage track cross section is uniformly continuous across the base. A round head jaw release stop screw 44 is screwed into a vertical bore in the top of the bracket 38 and held firmly in place by a jam nut 46.

A horizontal and open frame 50 is disposed above the base plate 10. As shown best in FIG. 3, the frame includes forward and rear side pieces 52, 54, respectively, formed integrally with right and left side pieces 56, 58, respectively. The frame includes at each of its corners a vertical bore 60 in which is mounted a separate respective vertical ball bushing 62 down through which extends a separate respective vertical guide post 64 rigidly secured at its lower end in the base plate.

Forward and rear vertical studs 66, 68, respectively are firmly secured at their lower ends in the forward and rear ends of the base just to the left of the conveyor track. Each stud extends up through a respective vertical stepped bore 70 in the forward and rear sides of the frame. A downwardly extending cylindrical spring seat 72 is mounted in each stepped bore 70 around a respective stud. A separate compression spring 74 is coaxially disposed around each stud to bear at its lower end against the bottom of a respective spring seat and at its top against an external snap ring 76 secured to the upper end of each stud so that the frame is urged downwardly toward the base plate 10.

The frame is held up by a rear horizontal transverse lever arm 78 and a forward 7-shaped lever arm 80. Each lever arm has a respective end disposed under respective vertical dogpoint set screws 82 threaded through vertical bores 84 in forward and rear ears 86, 87, respectively, on the forward and rear sides of the frame. A separate respective jam nut 88 holds each set screw 82 in the desired elevation.

The right end of the rear lever arm 78 is secured by a transverse pin 90 to the rear end of a longitudinal shaft 92 journaled in respective bushings 94 in a pair of longitudinally spaced pillar blocks 96 secured by screws 98 to the top of the forward and rear ends of the base plate. The intermediate portion of the forward lever arm 80 is secured by a transverse pin 99 to the forward end of shaft 92. The lower portion of the forward lever extends downwardly and inwardly forward of the base, and terminates adjacent a frame lifting cam 100 secured by a key 101 to rotate with a horizontal longitudinal cam shaft 102 in a counter clockwise direction (as viewed in FIG. 2). A rotatable cam follower wheel 104 at the lower end of the forward lever arm is held against the lifting cam 100 by the springs 74 that urge the frame downwardly. As shown best in FIG. 2, the lifting cam includes a recessed portion 106, which permits the levers 78 and 80 to move down and up as the lifting cam is rotated about 90° counter clockwise from the position shown in FIG. 2.

A stop cam 108 is secured to the cam shaft 102 under the forward edge of the base plate (see FIG. 1), and includes a relatively small lobe 110, which periodically raises a cam follower wheel 112 mounted at the right end (FIG. 2) of a transverse and horizontal stop lever arm 114 secured intermediate its ends by a longitudinal pivot pin 116 in a downwardly opening transverse groove 118 of a block 119 secured by screws 120 to the underside of the base 10. A vertical compression return spring 122 is mounted in an upwardly opening recess 124 in the stop lever 114 to the right of the pivot pin 116 and urges the stop lever to pivot in a clockwise direction and cause the left end of the stop lever to bear against the lower end of a vertical stop pin 126 which extends up through a vertical bore 128 in the forward side of the base. A compression spring 130 is coaxially disposed around the lower end of the stop pin 126 to bear against a head 132 on the lower end of the pin and against the bottom of the base to push the stop pin 126 down below the floor of the conveyor track when the stop lever 114 is pivoted by the lobe 110 on the stop cam. After the lobe 110 passes the cam follower wheel 112, the return spring 122 restores the stop lever 114 and stop pin 126 to the position shown in FIG. 2 to position the boats 28 longitudinally in the conveyor track.

A longitudinally extending horizontal left jaw 140 is secured underneath a pair of transverse guide rods 142 which extend through transverse bores 144 in upwardly extending lugs 146 formed integrally with the upper surface of the left jaw. Vertical pins 148 rigidly secure each guide rod to the left jaw. The left ends of the guide rods each extend into respective transverse bores 150 through a longitudinal bar 151 held by screws 152 to the top of the left side of the frame. Each guide rod extends horizontally to the right from the left jaw through a respective transverse bore 153 in an elongated horizontal right jaw 154, collars 156, and respective bores 158 in a longitudinal bar 160 secured by screws 162 to the top of the right side of the frame. The right ends of the guide rods are secured by pins 164 into opposite ends of a longitudinal push bar 166 that includes an outwardly opening clevis 168 formed integrally at its center. A roller 170 is mounted to rotate about a horizontal longitudinal pin 172 in the clevis. The upper end of a downwardly extending lever 180 bears against the outer portion of the roller 170 and is secured intermediate its ends by a set screw 182 to a longitudinal horizontal pivot pin 184 mounted in a hinge 186 held by screws 188 to the under side of the base. The lower portion of the lever 180 extends downwardly and inwardly to terminate adjacent an egg-shaped transfer cam 190 mounted on the cam shaft 102.

A cam follower wheel 192 mounted in the lower end of the lever 180 is held against the transfer cam by separate compression springs 194 respectively disposed coaxially around each guide rod 142 between the left jaw and the longitudinal bar 151 on the top of the left side of the frame.

As shown best in FIGS. 2 and 3, the left jaw includes an elongated horizontal groove 200 in which is mounted a plurality of jaw teeth 202. Referring to FIG. 2, each tooth is held in place by a separate horizontal transverse bolt 204 disposed in a respective bore 206 extending through the jaw. The right end of each bolt 204 is threaded into the left face of a respective tooth, and a compression spring 208 coaxially disposed around the bolt 204 between the tooth and the right end of the stepped bore urges each tooth to the right until it is stopped by the head of its respective bolt bearing against the left end of the stepped bore in the jaw.

As shown best in FIG. 3, each tooth is longitudinally spaced from the adjacent teeth, and the adjacent corners of the teeth are beveled to provide enlarged entrances 210 into transverse channels 212 between adjacent teeth.

The right jaw includes an elongated longitudinal and horizontal shelf 214 extending toward the teeth in the left jaw.

The jaws are held apart by a locking mechanism 216 shown best in FIGS. 2, 3 and 4. A longitudinally extending lock release block 218 is disposed in a longitudinal slot 220 in the top and central part of the right jaw. A vertical pin 222 formed integrally with the lock release block extends down through a vertical bore 224 which opens out of the bottom of the jaw. As shown best in FIG. 2, the lower end of the pin 222 is tapered and disposed above but slightly to left of center of the round head stop screw 44.

A vertical compression spring 226 is disposed at its lower end around a vertical retainer 228 formed integrally with the top surface of the lock release block, and bears at its upper end against a plate 230 secured by screws 232 over the longitudinal slot. A downwardly extending retainer 234 is formed integrally with the plate and fits coaxially into the upper end of the compression spring 226. A pair of longitudinal and horizontal locking levers 240 are each secured by shoulder bolts 242 adjacent their outer ends to the left face of the jaw to pivot about the shoulder bolts. The inner or adjacent ends of each lever include a respective notch 244 to receive a respective horizontal and transverse pin 246 on the lock release block. The outer end of each locking lever fits up into a respective notch 248 in the underside of each guide rod so the right jaw is prevented from being pushed to the left (as viewed in FIGS. 2 and 3) by a separate compression spring 250 disposed around each guide rod 142 between the right face of the right jaw and the separate respective collar 156 secured by a set screw 254 to each guide rod.

A pair of horizontal transverse jaw stop pins 256 are threaded at their left ends into the left longitudinal bar 151 and held in place by jam nuts 258. Each stop pin terminates at its right end just above the left jaw, and is disposed to engage the left face of the right jaw as the guide rods 142 are pushed to the left to bring the jaws over a discharge opening 260 in the base plate.

The operation of the apparatus is as follows. A series of boats 28 are pushed along the conveyor track in the direction of the arrows until the forward boat is stopped by engaging the stop pin 126. The boats may be driven by any suitable automatic means (not shown). The cam shaft 102 is rotated by conventional means (not shown) in a counter clockwise direction as indicated by the arrow in FIG. 2. As the lifting cam 100 rotates, the lifting lever 80 is permitted to dip so that the frame and jaws move down over the upwardly extending wires of the transistor headers in the boats. As shown best in FIG. 3 the left long wire on each header is at the entrance of a respective channel between adjacent teeth on the left jaw. The other two (forward and rear) long wires on each header are to be clamped between the jaws when they close. As the frame moves down, the lock release pin 222 engages the left side of the end head lock release screw 44, causing the lock release block to move up and lift the adjacent or inner ends of the locking levers 240 (FIG. 4) so that the outer ends of the levers move down out of the locking notches 248 in the guide rods. The right jaw is then moved to the left by compression springs 250 and clamp the forward and rear long wires of each transistor between the jaws. The left long wire of each transistor moves into a respective channel 212 so that it does not interfere with proper closing of the jaws. Moreover, each tooth in the left jaw is free to move laterally to accommodate any individual variations in the particular wire being clamped. As the cam shaft 102 continues to rotate, the left lever 80 is returned to the position shown in the drawings so that the frame is restored to its original height. The jaws are held firmly shut by the compression springs 250 so that the transistor headers are pulled up out of their respective recesses in the boat, which is prevented from being lifted by the inwardly extending lips on the conveyor track.

Further rotation of the cam shaft brings the lobe of the egg-shaped transfer cam into engagement with the cam follower wheel 192 on the transfer lever so the guide rods 142 are forced to the left. The jaws are held closed during the initial part of this operation until the transistor headers are carried over the discharge opening 260 in the base. At this point, the jaw stop pins 256 engage the left face of the right jaw and prevent it from moving further to the left. Continued rotation of the transfer cam drives the guide rods and left jaw further to the left so that the jaws open and drop the articles through the discharge opening. The guide rods are pushed sufficiently far to the left to slide the notches in them over the locking levers 240 so the compression spring 226 (FIG. 4) forces the outer ends of the locking levers up into the locking notches to hold the jaws open. The transfer cam continues to rotate, and the compression springs 194 return the guide rods and open jaws to the positions shown in the drawings.

While the jaws are lifted and moved laterally, the lobe 110 on the stop cam 108 actuates the stop lever 114 to permit the stop pin 126 to be depressed below the level of the conveyor track floor. The boats are moved forward, and before the forward end of the next boat reaches the stop pin, the lever arm 114 is returned to its original position so the stop moves up to stop the next boat in the proper position with respect to the jaws. The emptied boat slides down the discharge chute 22. In operation, the stop pin 126 returns to its upper position just after the trailing end of the boat being discharged clears the forward end of the retaining lips 26 on a conveyor track. Thus, the rear end of the emptied boat is kicked up to facilitate its sliding down the discharge chute.

The foregoing sequence of operations is repeated automatically as often as required to unload the desired number of headers from the boats.

I claim:

1. Apparatus for removing articles from a transfer station on an elongated horizontal conveyor, upright guide posts mounted adjacent the transfer station to extend above it, a movable frame mounted on the guide posts, at least one rod mounted on the frame above the transfer station to be movable axially in a direction transverse to the guide posts, a first jaw rigidly mounted on the rod to be movable with it, a second jaw mounted on the rod to face the first jaw, the second jaw being mounted to slide along the rod toward and away from the first jaw, a spring urging the second jaw toward the first jaw, latch means on the rod for engaging the second jaw to prevent it from moving along the rod toward the first jaw, means for moving the frame on the guide posts down from an upper position and a lower position over the transfer station, means for releasing the latch means independently of axial movement of the rod as the frame is moved from the upper to the lower position to release the latch means so the second jaw is urged by the spring to move toward the first jaw and grip an article between the jaws at the transfer station, means for raising the frame on the guide posts from the lower to the upper position with the jaws engaging and lifting the article from the conveyor, means for moving the rod axially when the frame is in the upper position to transfer the jaws and article from over the transfer station, and means for spreading the jaws apart as they move away from the transfer station to release the article.

2. Apparatus for removing articles from a transfer station on an elongated horizontal conveyor, upright guide posts mounted adjacent the transfer station to extend above it, a movable frame mounted on the guide posts, at least one rod mounted on the frame above the transfer station to be movable axially in a direction transverse to the guide posts, a first jaw rigidly mounted on the rod to be movable with it, a second jaw mounted on the rod to face the first jaw, the second jaw being mounted to slide along the rod toward and away from the first jaw, a spring urging the second jaw toward the first jaw, latch means on the rod for engaging the second jaw to prevent it from moving along the rod toward the first jaw, means for moving the frame on the guide posts down from an upper position and a lower position over the transfer station, means for releasing the latch means independently of axial movement of the rod as the frame is moved from the upper to the lower position to release the latch means so the second jaw is urged by the spring to move toward the first jaw and grip an article between the jaws at the transfer station, means for raising the frame on the guide posts from the lower to the upper position with the jaws engaging and lifting the article from the conveyor, means for moving the rod axially when the frame is in the upper position to transfer the jaws and article from over the transfer station, stop means on the frame for engaging the second jaw as the rod is moved axially to spread the jaws apart as they move away from the transfer station to release the article.

3. Apparatus for removing articles from a transfer station on an elongated horizontal conveyor, upright guide posts mounted adjacent the transfer station to extend above it, a movable frame mounted on the guide posts, at least one rod mounted on the frame above the transfer station to be movable axially in a direction transverse to the guide posts, a first jaw rigidly mounted on the rod to be movable with it, a second jaw mounted on the rod to face the first jaw, the second jaw being mounted to slide along the rod toward and away from the first jaw, a spring urging the second jaw toward the first jaw, latch means on the rod for engaging the second jaw to prevent it from moving along the rod toward the first jaw, means for moving the frame on the guide posts down from an upper position and a lower position over the transfer station, means for releasing the latch means independently of axial movement of the rod as the frame is moved from the upper to the lower position to release the latch means so the second jaw is urged by the spring to move toward the first jaw and grip an article between the jaws at the transfer station, means for raising the frame on the guide posts from the lower to the upper position with the jaws engaging and lifting the article from the conveyor, means for moving the rod axially when the frame is in the upper position to transfer the jaws and article from over the transfer station, means for spreading the jaws apart as they move away from the transfer station to release the article, and means for automatically actuating the latch means to engage the second jaw as the jaws are spread apart.

References Cited in the file of this patent

UNITED STATES PATENTS

| | | |
|---|---|---|
| 637,594 | Hett | Nov. 21, 1899 |
| 1,519,736 | Lewis | Dec. 16, 1924 |
| 1,620,778 | Odom | Mar. 15, 1927 |
| 1,993,754 | Smith | Mar. 12, 1935 |
| 2,798,935 | Kip | July 9, 1957 |
| 2,862,634 | Chalich | Dec. 2, 1958 |
| 2,997,185 | Morean | Aug. 22, 1961 |
| 2,999,604 | Chalich | Sept. 12, 1961 |
| 3,033,387 | Greenberg | May 8, 1962 |